United States Patent [19]

Rautio

[11] Patent Number: 5,423,358
[45] Date of Patent: Jun. 13, 1995

[54] FASTENING SYSTEM FOR A CIRCULAR SAW BLADE

[76] Inventor: Kauko Rautio, Kyttäläntie 1, Mäntyharju, Finland, SF-52700

[21] Appl. No.: 81,919

[22] Filed: Jun. 22, 1993

[30] Foreign Application Priority Data

Jul. 3, 1992 [FI] Finland .................................. 923096

[51] Int. Cl.⁶ .............................................. B27C 9/00
[52] U.S. Cl. ...................................... 144/223; 144/41;
83/666; 83/676; 83/698.41
[58] Field of Search ............ 83/481, 666, 676, 698.41;
144/39, 41, 218, 222, 223

[56] References Cited

U.S. PATENT DOCUMENTS

| | | | |
|---|---|---|---|
| 4,241,633 | 12/1980 | De Luca | 83/698 X |
| 4,388,848 | 6/1983 | Albert | 83/698 X |
| 4,984,614 | 1/1991 | Landers et al. | 144/220 |
| 5,031,364 | 7/1991 | Belanger | 51/170 T |

FOREIGN PATENT DOCUMENTS

| | | | |
|---|---|---|---|
| 423003 | 12/1925 | Germany . | |
| 512461 | 1/1955 | Italy | 144/223 |
| 7118 | 6/1898 | Norway . | |

Primary Examiner—Richard K. Seidel
Assistant Examiner—Raymond D. Woods
Attorney, Agent, or Firm—Pennie & Edmonds

[57] ABSTRACT

A fastening system for a circular saw blade (1, 10), wherein the circular saw blade is fastened by means of a screw/screws (2, 9) to a fastening flange on the turning arbor (6), to a chipping edger (3) in a hewing saw, or to a chipping cutter (8). The fastening part (5, 11) of the circular saw blade (1, 10) is made frustoconical and the circular saw blade (1, 10) is fastened between two corresponding frustoconical surfaces.

6 Claims, 2 Drawing Sheets

FASTENING SYSTEM FOR A CIRCULAR SAW BLADE

FIELD OF THE INVENTION

The present invention relates to a fastening system for a circular saw blade, in which the circular saw blade is fastened by means of a screw/screws to a fastening flange on the turning arbor, to a chipping edger in a hewing saw, or to a chipping cutter.

BACKGROUND OF THE INVENTION

In prior-art systems, the steel frame requires reinforcement, i.e. additional thickness, in order for the screw fastening to be sufficiently sturdy. In these systems it is necessary to use a plurality of countersunk screws, the opening and fastening of which in connection with servicing is cumbersome and very time-consuming. When the blade is of the same material in the area of the reinforcement, it reacts immediately to heat, which in turn causes distortions in the actual blade. The prior-art systems in which there are reinforcements are also very expensive.

SUMMARY OF THE INVENTION

The object of the invention is to eliminate the disadvantages described above. The fastening system according to the invention is characterized in that the fastening part of the circular saw blade is made frustoconical and that the circular saw blade is fastened between two corresponding frustoconical surfaces. A blade such as this is considerably more economical to manufacture, since areas of different thickness are not necessary in it. The blade is considerably more rapid to detach and fasten in connection with servicing, since the fastening system does not require as many screws as do the prior-art systems. The blade is tightened evenly by its frustoconical surface. The blade may even be in a plurality of segments, since owing to the frustum it centers in place. The frustoconical part also provides additional sturdiness for the blade, and it is therefore also easier to handle in connection with servicing. By using the system according to the invention, a so-called smooth frontal surface is obtained, i.e. one side of the circular saw blade is left free as far as the hub; this is required in chipping cutters and in chipping canters.

One embodiment of the invention is characterized in that the fastening flange, which may be a chipping edger or a chipping cutter, has a frustoconical recess in which the frustoconical part of the circular saw blade is placed, and that the circular saw blade is tightened in place by means of a tightening flange which has a frustoconical edge. Frustoconical fastening such as this is easy and economical in terms of manufacturing technique and reliable in terms of fastening.

Another embodiment of the invention is characterized in that the tightening flange is tightened in place by means of a screw in its hub. This is a very rapid fastening system in terms of servicing.

A third embodiment of the invention is characterized in that the tightening flange is tightened in place by means of screws passing through the fastening flange. In this system the tightening flange may be circular, and its tightening also does not require many screws.

A further embodiment of the invention is characterized in that the frustum angle is 30°–60° relative to the plane of the circular saw blade. The frustum angle will probably be 45°.

One embodiment is further characterized in that the tightening flange is of a different material than the circular saw blade, for example of cast steel. The tightening flange is heated up considerably by friction in the frontal surface and, for example, cast steel does not become easily distorted regardless of heating up. Heat generated by friction will not react directly on the actual circular saw blade, as it does in prior-art systems.

BRIEF DESCRIPTION OF THE DRAWINGS

The invention is described below with the help of examples, with reference to the accompanying drawings, in which.

DETAILED DESCRIPTION OF THE INVENTION

Figure 2:
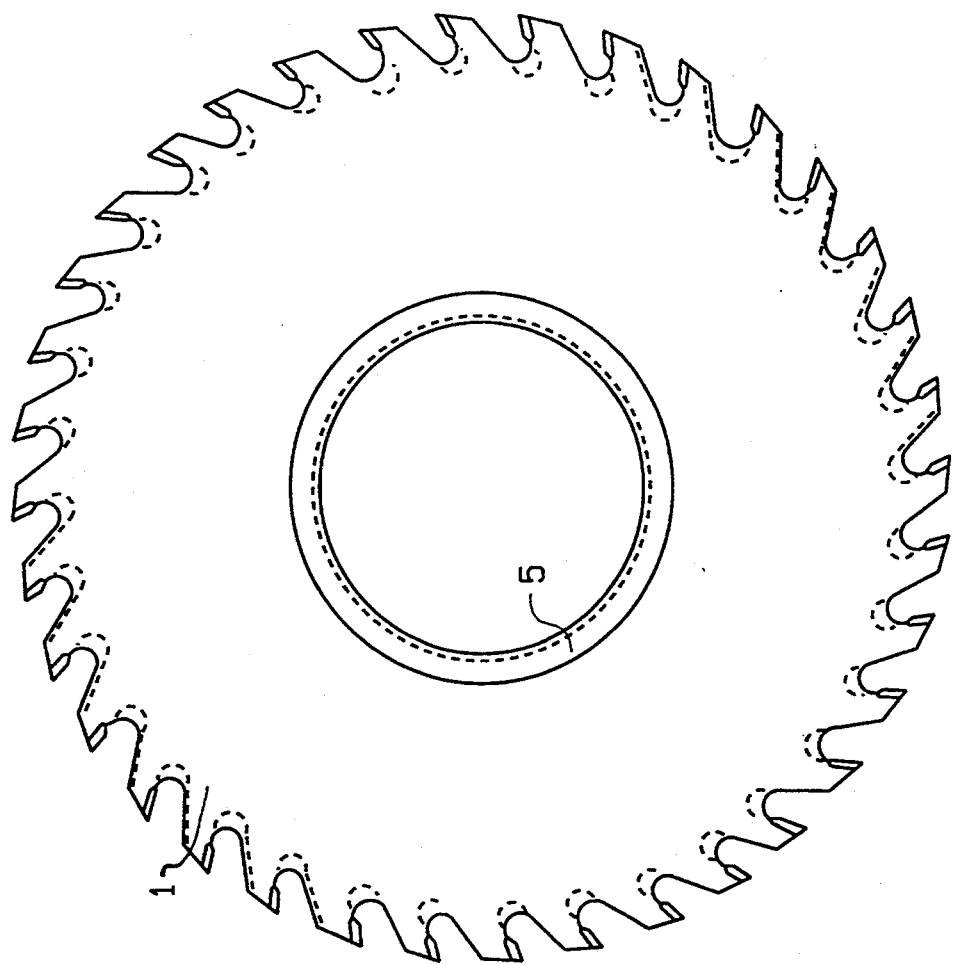
FIG. 2 depicts the circular saw blade belonging to the fastening system.
Figure 1:
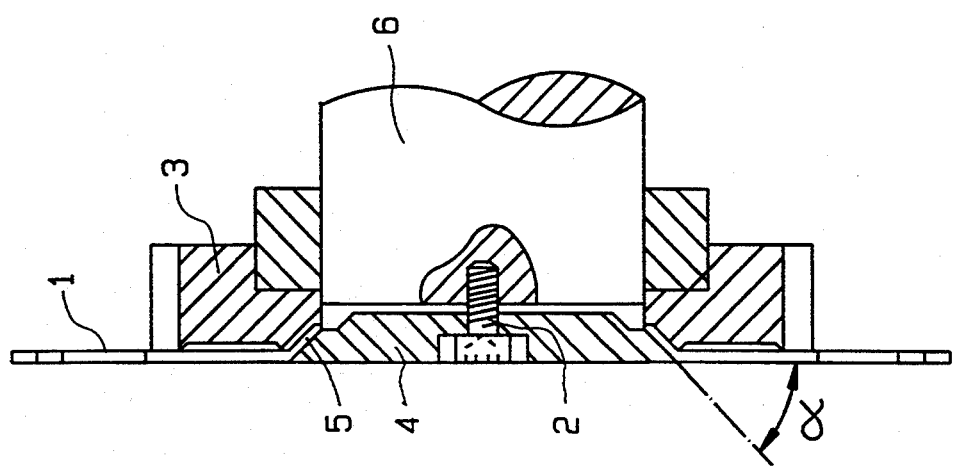
FIG. 1 is a cross-sectional representation of the fastening system for a circular saw blade, according to one embodiment.
Figure 4:
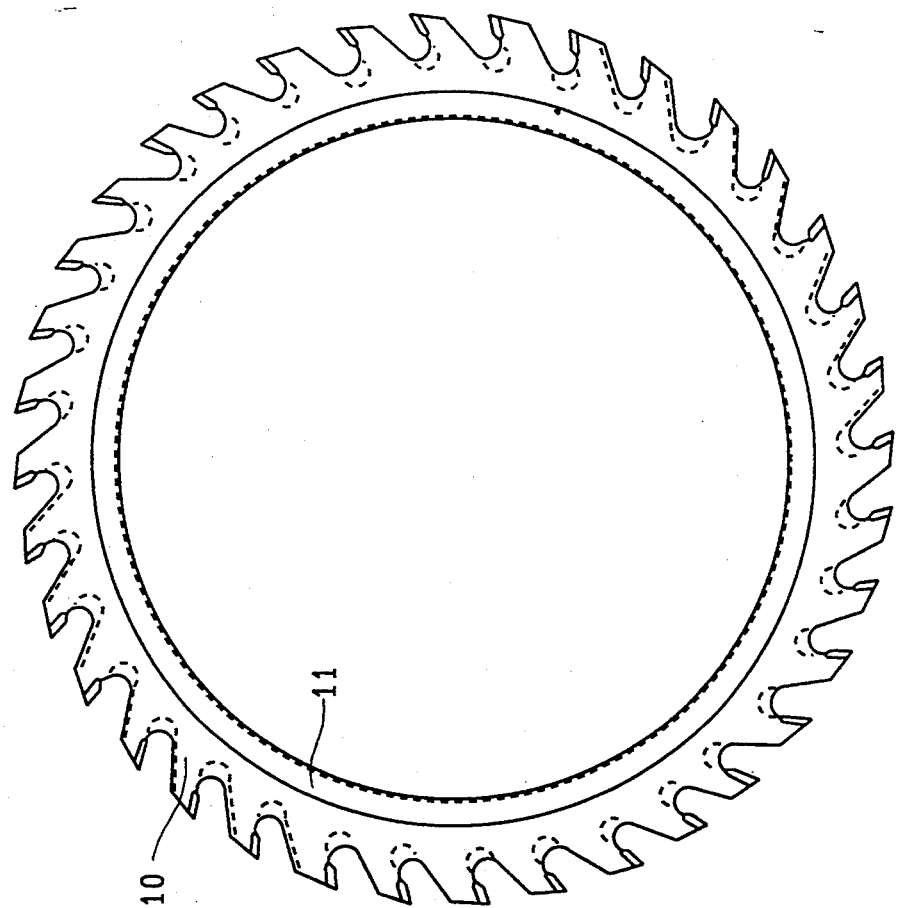
FIG. 4 depicts a circular saw blade of this fastening system.

In the embodiment shown in FIG. 1, the circular saw blade 1 is fastened by means of a screw 2 so that the circular saw blade is tightened between a chipping edger 3 and a fastening flange 4. The fastening part 5 of the circular saw blade 1 has been made frustoconical, and the tightening surfaces in the chipping edger 3 and the fastening flange 4 are corresponding frustoconical surfaces. The tightening screw 2 tightens to the turning arbor 6, whereby the chipping edger 3 is also tightened in place by the same tightening screw.

Figure 3:
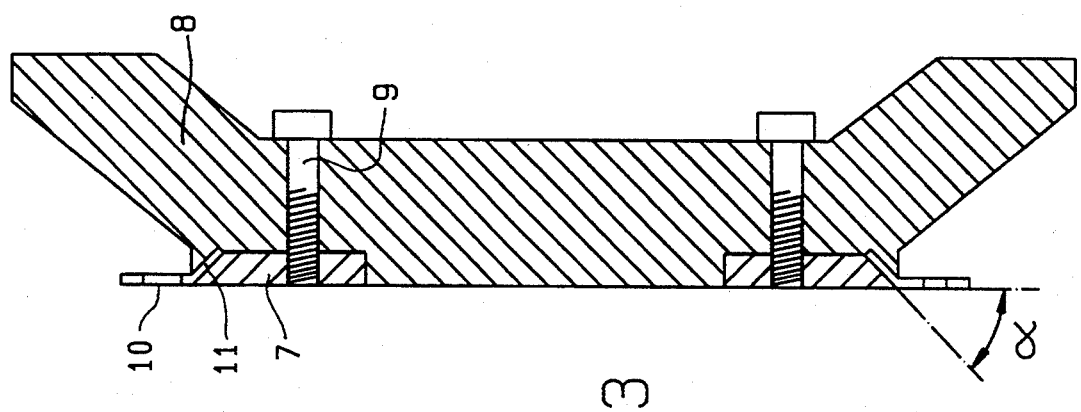
FIG. 3 depicts the fastening system for a circular saw blade, according to another embodiment.

In the embodiment shown in FIG. 3, the fastening flange 7 is circular, and it is tightened in place by means of screws 9 passing through a chipping cutter 8. The frustoconical fastening part 11 of the circular saw blade 10 is tightened between the frustoconical surfaces in the chipping cutter 8 and the fastening flange 7.

In both embodiments, the cone angle α is 45°. The detaching and fastening of the circular saw blade is easy and rapid owing to the large size and small number of the screws.

I claim:

1. A fastening system for a circular saw blade (1, 10), wherein the circular saw blade is fastened by means of at least one screw (2, 9) to a member selected from the group consisting of a chipping edger (3) in a hewing saw, and a chipping cutter (8), characterized in that the circular saw blade is generally planar and includes a fastening part (5, 11) of frustoconical configuration which defines a cone angle ($\alpha$) of between about 30°–85° relative to a plane defined by said circular saw blade (1, 10) and that the fastening part (5, 11) of the circular saw blade (1, 10) is fastened between two corresponding frustoconical surfaces.

2. A fastening system according to claim 1, wherein the chipping edger or the chipping cutter each have a frustoconical recess in which the frustoconical fastening part of the circular saw blade (1, 10) is placed, and that the circular saw blade is tightened in place by means of said fastening flange.

3. A fastening system according to claim 1, characterized in that the fastening part includes a tightening flange (4) which is fastened in place by means of one of said at least one screw (2) in a hub portion of said tightening flange.

4. A fastening system according to claim 1, characterized in that the fastening part includes a tightening flange (7) which is fastened in place by means of said at least one screw (9) passing through the tightening flange (8).

5. A fastening system according to claim 3 or 4 characterized in that the tightening flange (4,7) is of a different material than the circular saw blade.

6. In a fastening system for a generally planar circular saw blade (1,10) wherein the circular saw blade is fastened by screw means between a fastening flange (4, 7) and a further cutting means (3, 8), the improvement wherein:
   a) the fastening flange (4, 7) and cutting means (3, 8) both include frustoconical fastening surfaces; and
   b) the circular saw blade includes a fastening part (5, 11) of frustoconical configuration which defines a cone angle ($\alpha$) of between about 30°–85° relative to a plane defined by said circular saw blade (1, 10) for fastening between said frustoconical fastening surfaces.

* * * * *